(12) United States Patent
Umemura et al.

(10) Patent No.: US 7,287,429 B2
(45) Date of Patent: Oct. 30, 2007

(54) CAPACITIVE ACCELERATION SENSOR SYSTEM

(75) Inventors: Akinobu Umemura, Nagoya (JP); Hirokazu Ito, Obu (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 11/073,600

(22) Filed: Mar. 8, 2005

(65) Prior Publication Data
US 2005/0210980 A1    Sep. 29, 2005

(30) Foreign Application Priority Data
Mar. 25, 2004 (JP) ............................. 2004-090409
Apr. 30, 2004 (JP) ............................. 2004-136418

(51) Int. Cl.
*G01P 15/125* (2006.01)
(52) U.S. Cl. .................................................. 73/514.32
(58) Field of Classification Search ............. 73/514.32, 73/1.38, 514.15
See application file for complete search history.

(56) References Cited

U.S. PATENT DOCUMENTS

| 5,563,343 A | 10/1996 | Shaw et al. |
| 5,610,335 A | 3/1997 | Shaw et al. |
| 6,149,190 A | 11/2000 | Galvin et al. |
| 6,170,332 B1 | 1/2001 | MacDonald et al. |
| 6,199,874 B1 | 3/2001 | Galvin et al. |
| 6,257,061 B1 | 7/2001 | Nonoyama et al. ...... 73/514.32 |
| 6,483,322 B2 * | 11/2002 | Aoyama et al. ......... 73/514.32 |

FOREIGN PATENT DOCUMENTS

| JP | A-05-319203 | 12/1993 |
| JP | A-H06-074968 | 3/1994 |
| JP | A-2001-336618 | 12/2001 |

OTHER PUBLICATIONS

Japanese Office Action issued from Japan Patent Office dated Jul. 11, 2007 in the corresponding Japanese Patent Application No. 2004-090409

* cited by examiner

*Primary Examiner*—John E. Chapman
(74) *Attorney, Agent, or Firm*—Posz Law Group, PLC

(57) ABSTRACT

An acceleration sensor system includes: a first and a second fixed electrodes; a movable electrode for providing a first and a second capacitors; a detection capacitor for detecting a capacitance difference between the first and the second capacitors; a charge voltage conversion circuit for converting a capacitance change of the detection capacitor to an output voltage; a detection bias voltage applying circuit; a vibrating circuit for vibrating the movable electrode such that a displacement bias voltage is applied in a first period and no displacement bias voltage is applied in a second period; a sampling circuit for sampling the output voltage during the second period when the movable electrode is constantly vibrated; and an acceleration signal generating and outputting circuit for generating an acceleration signal on the basis of a sampling result.

8 Claims, 6 Drawing Sheets

CAPACITIVE ACCELERATION SENSOR SYSTEM

CROSS REFERENCE TO RELATED APPLICATIONS

This application is based on Japanese Patent Applications No. 2004-90409 filed on Mar. 25, 2004, and No. 2004-136418 filed on Apr. 30, 2004, the disclosures of which are incorporated herein by reference.

FIELD OF THE INVENTION

The present invention relates to a capacitive acceleration sensor system suitably used for an automotive vehicle control.

BACKGROUND OF THE INVENTION

As disclosed in Japanese Unexamined Patent Application Publication No. H6-74968 and Japanese Unexamined Patent Application Publication No. 2000-81449 (which corresponds to U.S. Pat. No. 6,257,061), capacitive acceleration sensors are in wide use in vehicle control and the like. This type of acceleration sensor has a capacitor for detection in which the distance between electrode plates is variable. The acceleration sensor is so designed that the following operation is performed: the state of charge storage in the capacitor based on change in the distance between electrode plates due to acceleration application is subjected to charge-voltage conversion through a charge-voltage conversion circuit; it is thereby outputted as an acceleration signal.

With respect to capacitive acceleration sensors, recently, the following has been implemented to reduce their size and simplify assembling processes: an inertial displacement body for acceleration detection, the comb-like electrodes of a capacitor for detection, and the like are integrally formed by micromachining technology for silicon substrates. However, as sensor components are microminiaturized as mentioned above, problems become prone to occur. Such problems can include malfunctions due to breakage in a beam portion that couples an inertial displacement body with a frame, fine foreign particle lodged in between electrodes, and the like. The above prior arts disclose capacitive acceleration sensors provided with a self-diagnosing function for these malfunctions.

However, the technologies disclosed in the above prior arts have problems. In either technology, acceleration detection must be halted during self-diagnosis whereupon a simulated acceleration, pseudo-acceleration, false acceleration, or the like, is applied to a detecting capacitor of the sensor for testing purposes resulting in the application of the false acceleration for self-diagnosis on an intermittent or irregular basis and leading to attendant drawbacks. As an example, it will be assumed that the displacement rigidity of a movable electrode becomes abnormal due to breakage, lodging of foreign particle, or the like. In self-diagnosis mode, the movable electrodes are forcedly displaced; therefore, the anomaly is easily detected during the self diagnosis. In acceleration detection mode, however, effective displacement is not necessarily caused in the movable electrodes unless great acceleration is externally applied. Thus, if an anomaly occurs only during operation of the acceleration mode it is difficult to find.

When false acceleration is applied in self-diagnosis mode, the movable electrodes of the detecting capacitor are forcedly displaced from their neutral points. Therefore, when the mode is changed to acceleration detection mode in which false acceleration is not applied, the influence of forced displacement of the electrodes in self-diagnosis mode remains for a certain period like damped vibration. As a result, the zero point of a charge-voltage conversion circuit takes forever to stabilize, and thus a problem occurs. The accuracy of acceleration detection is degraded.

Thus, the sensor cannot monitor an anomaly of the sensor with high accuracy all the time, and further, the sensor cannot detect acceleration with high accuracy.

Further, recently, demand for higher-sensitivity acceleration sensors for vehicles has been increased. However, since a charge-voltage conversion circuit is used for the output portion of sensors, problems arise. With the enhancement of the sensitivity of sensors, the zero point can drift with time or due to temperature change because of the following: deterioration in or the temperature characteristics of operational amplifiers that play a key role in charge-voltage conversion or peripheral discrete elements.

Japanese Unexamined Patent Publication No. 2001-336618 discloses the following method as a solution for the above-mentioned problems: conditions for detecting the horizontal position of a vehicle are provided for automatically correcting errors due to the temperature or aging of an acceleration sensor installed in the vehicle. (The conditions include a transmission in neural, a brake released, and no rotation of wheels.) The acceleration sensor is corrected only when the conditions are met.

However, the method disclosed in the above prior art includes the following problems:

(1) The zero point cannot be corrected unless the vehicle is brought into a horizontal position; therefore, the timing of correction is limited.

(2) A signal from the vehicle is indispensable to acquire conditions for horizontality detection. For this reason, an acceleration sensor cannot automatically carry out correction by itself.

Thus, the sensor cannot compensate a zero point drift all the time, and the sensor cannot compensate the zero point drift without additional parts.

SUMMARY OF THE INVENTION

In view of the above-described problem, it is an object of the present invention to provide a capacitive acceleration sensor system having high detection accuracy with monitoring and/or compensating an anomaly of the sensor.

An acceleration sensor system includes: a first fixed electrode and a second fixed electrode; a movable electrode disposed between the first and the second fixed electrodes for providing a first capacitor between the first fixed electrode and the movable electrode and a second capacitor between the second fixed electrode and the movable electrode; a detection capacitor for detecting a capacitance difference between the first capacitor and the second capacitor; a charge voltage conversion circuit for outputting and converting a capacitance change of the detection capacitor to an output voltage, the capacitance change being derived from a displacement of the movable electrode caused by an acceleration applied to the sensor; a detection bias voltage applying means for applying a detection bias voltage between the first fixed electrode and the second fixed electrode; a vibrating means for vibrating the movable electrode in an acceleration detection direction in such a manner that the movable electrode is displaced in a first period in which the vibrating means applies a displacement bias voltage to the movable electrode, the movable electrode is returned in a second period in which no displacement bias voltage is applied to the movable electrode, and the first and the second period are repeated alternately; a sampling means for sampling the output voltage of the charge voltage conversion circuit to detect the acceleration in such a manner that the sampling means selectively samples the output voltage during the second period in a case where the movable electrode is steadily vibrated; and an acceleration signal generating and outputting means for generating and outputting an acceleration signal on the basis of a sampling result of the output voltage of the charge voltage conversion circuit.

In the above system, the movable electrode is constantly stimulated with a pseudo acceleration generated by the displacement bias voltage. Further, the acceleration of the sensor is detected in the second period, in which no displacement bias voltage is applied to the movable electrode. Thus, the movable electrode is always displaced by the vibration in a case where the acceleration is detected. Therefore, if the elasticity of the movable electrode is changed by a jamming with a fine particle between the movable electrode and the fixed electrode, the output voltage of the sensor is much changed so that a failure of the sensor such as the jamming of the particle is detected accurately. In the above system, the movable electrode is always vibrated even when no displacement bias voltage is applied to the movable electrode; and therefore, the pseudo acceleration is applied to the sensor. This pseudo acceleration bias is stabilized so that the zero point of the sensor output is much stabilized. Thus, the acceleration detection accuracy is improved. Specifically, when the displacement bias voltage is repeatedly applied to the movable electrode, the movable electrode is displaced transiently. However, as the vibration cycle is continued, the transient acceleration bias state of the movable electrode gradually approaches a static state. Accordingly, the zero point of the sensor output also becomes stable. After the zero point is stabilized, the acceleration is sampled; and therefore, the acceleration detection accuracy of the sensor is much improved. Thus, the capacitive acceleration sensor system has high detection accuracy with monitoring an anomaly of the sensor.

Preferably, the second period has a length, which is determined to stabilize the output voltage of the charge voltage conversion circuit to a predetermined constant value after the output voltage of the charge voltage conversion circuit in the second period just before the first period is gradually increased in accordance with repetitive vibration of the movable electrode when no acceleration is applied to the sensor. More preferably, the detection bias voltage applying means sets a primary term and a secondary term. The detection bias voltage has a first polarity in the primary term, and the detection bias voltage has a second polarity in the secondary term. The first polarity is opposite to the second polarity. The vibrating means performs the first period of the displacement bias voltage during the primary term of the detection bias voltage applying means, and switches the first period to the second period before the detection bias voltage applying means is changed from the first term to the secondary term. The sampling means samples a first data of the output voltage of the charge voltage conversion circuit in the primary term after the vibrating means switches from the first period to the second period, and samples a second data of the output voltage of the charge voltage conversion circuit in the secondary term. The acceleration signal generating and outputting means generates and outputs the acceleration signal on the basis of a difference between the first and the second data.

Further, an acceleration sensor system for an automotive vehicle includes: a detection capacitor including a pair of electrodes, which is changeable in accordance with an acceleration applied to the sensor; an acceleration signal generating circuit including a charge voltage conversion circuit for outputting an acceleration signal; a memory for memorizing a reference offset output value, which is defined as a reference value of an offset output value of the acceleration signal generating circuit when both ends of the detection capacitor are short-circuited; and a zero point correcting means. The charge voltage conversion circuit includes an operational amplifier with a negative feedback capacitor for detecting a charge of the detection capacitor. The charge voltage conversion circuit converts a charge output change of the detection capacitor to a voltage change as the acceleration signal. The zero point correcting means short-circuits both ends of the negative feedback capacitor at a predetermined check time when the sensor is operated, detects the offset output value of the acceleration signal generating circuit as a current offset output value, and corrects a zero point of the acceleration signal on the basis of a comparison between the reference offset output value and the current offset output value.

In the above system, the zero point drift is corrected any time. For example, even when the vehicle is not disposed on a horizontal plane, the zero point drift can be corrected. Specifically, in a case where the negative feedback capacitor is shorted, the static capacitance of the detection capacitor does not affect the output of the acceleration signal generating circuit. Therefore, even when the vehicle is disposed on a slanted ground so that the gravity is applied to the sensor as a back ground acceleration, the zero pint drift can be corrected without the back ground acceleration influence. Thus, the system has high detection accuracy with monitoring and compensating an anomaly of the sensor.

Preferably, the reference offset output value is defined as the offset output value measured at a reference time prior to the check time, and the zero point correcting means corrects the zero point in such a manner that the zero point correcting means compensates a time drift of the offset output value detected between the reference time and the check time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
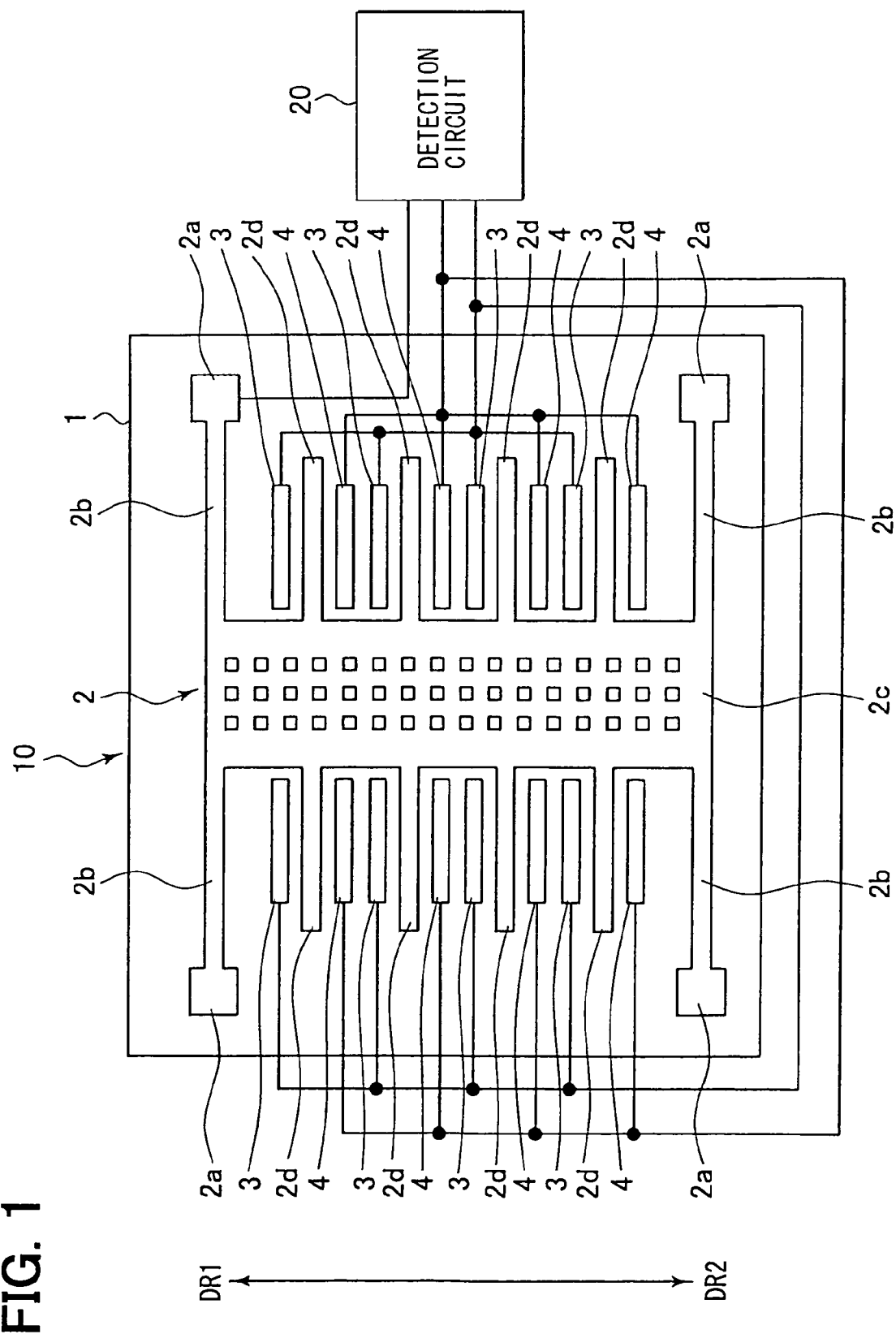
FIG. 1 is a schematic view showing an acceleration sensor system according to a first embodiment of the present invention.

FIG. 1 illustrates an example of the constitution of a capacitive sensor unit for use in an acceleration sensor system according to a first embodiment of the present invention. The sensor unit comprises a sensor element 10 and a detection circuit 20. In the sensor element 10, an inertial displacement body 2c that senses acceleration and develops displacement is coupled with a substrate 1 by anchor portions 2a through beam portions 2b. The substrate 1 functions as a sensor frame. Movable electrodes 2d are integrated with the inertial displacement body 2c, and fixed electrodes 3 and 4 are formed on the substrate 1 so that they are opposed to the movable electrodes 2d. The inertial displacement body 2c, the beam portions 2d, the anchor portions 2d, and the movable electrodes 2d integrally provide a beam structure 2.

In this embodiment, the beam structure 2 is so formed that it is in plate shape as a whole. The inertial displacement body 2c is rectangular. The beam portions 2b are so formed that they are extended from the respective corners of the inertial displacement body 2c in the direction of short sides. The ends of the beam portions 2b are constructed as the anchor portions 2a. On a pair of the long sides of the inertial displacement body 2c, the plurality of movable electrodes 2d are respectively disposed at constant intervals like a comb. The fixed electrodes 3 and 4 on the substrate 1 side are disposed opposite to each other in pairs on both sides of the movable electrodes 2d. The beam structure 2 is a single conductor, and the individual movable electrodes 2d are identical in potential. The sets of the fixed electrodes 3 opposed to a first side of each movable electrode 2d and the sets of the fixed electrodes 4 opposed to a second side are connected in common on the substrate 1 so that the respective sets are insulated from the other sets. Thus, the fixed electrodes 3 are brought to the same potential, and the fixed electrodes 4 are brought to the same potential.

Figure 2:
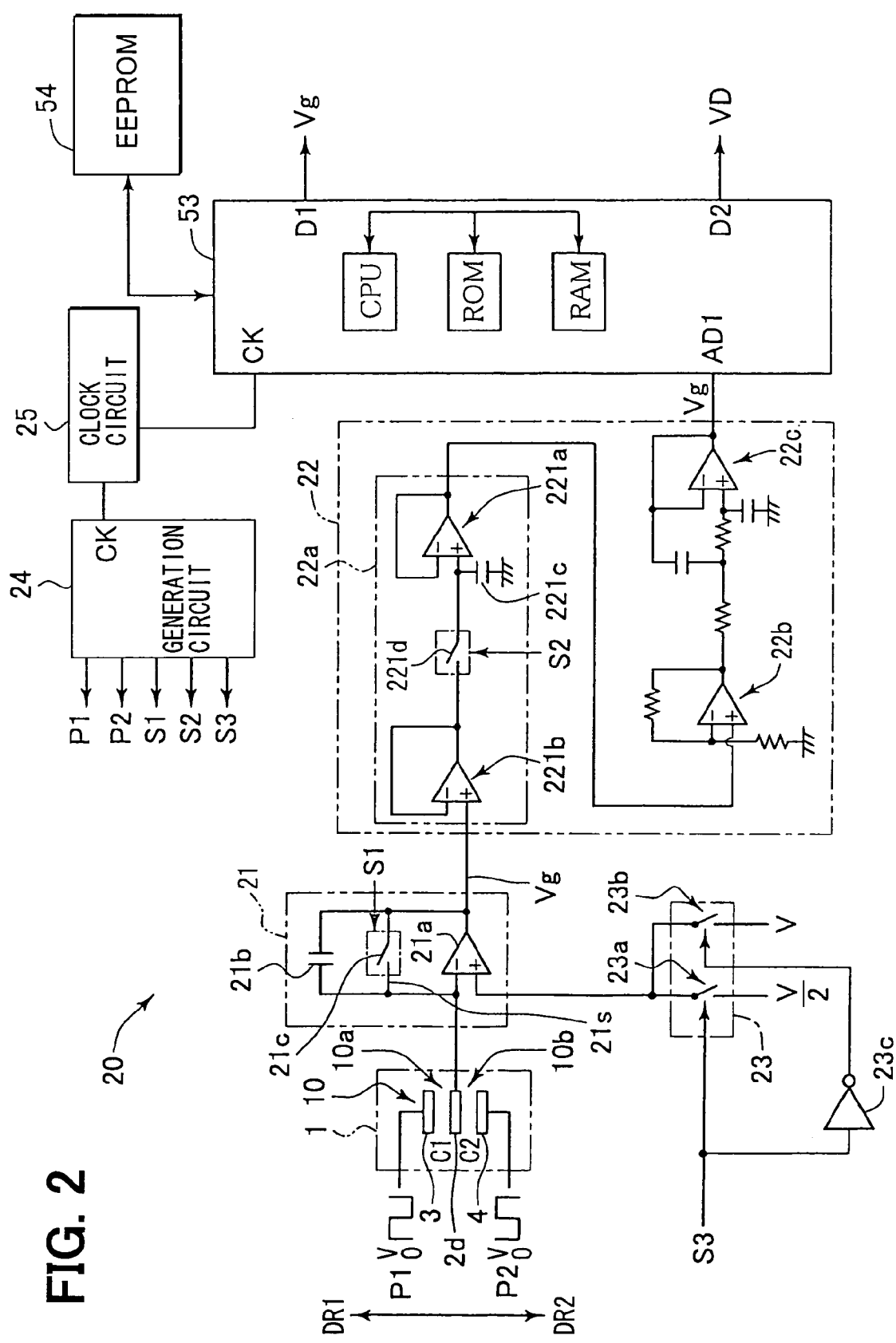
FIG. 2 is a circuit diagram showing the system according to the first embodiment.

With this electrode disposition, the fixed electrodes 3 and 4 respectively form a pair of detection capacitors 10a, 10b for detection connected in series with the movable electrodes 2d used as common electrodes. The direction in which the movable electrodes 2d and the fixed electrodes 3 and 4 are opposed to each other is the direction of acceleration detection (DR1 and DR2 in FIG. 1). (In FIG. 1, this direction is equivalent to the direction of the long sides of the inertial displacement body 2c.) When acceleration in the direction of detection is applied to the sensor unit, the inertial displacement body 2c is displaced by resultant inertia force while it elastically and flexurally deforms the beam portions 2b. As a result, the distances between the opposed movable electrodes 2d and fixed electrodes 3 and 4, that is, the capacitances of the capacitors 10a, 10b for detection vary according to the magnitude of acceleration. Therefore, with bias voltage for detection applied to the detection capacitors 10a, 10b, change in the capacitances of the detection capacitors 10a, 10b manifest themselves as change in the state of stored charge. Consequentially, this can be outputted as an acceleration signal Vs by converting it into voltage through the charge-voltage conversion circuit 21 as illustrated in FIG. 2.

The sensor unit that includes the beam structure 2 and the substrate 1 as substantial parts is packed onto a single chip as a single structure together with the comb-like electrode structure and the like. At this time, micromachining for Silicon substrates based on dry etching techniques such as high-energy plasma etching is used. This is a typical example of application of so-called MEMS (Micro-Electro Mechanical Systems) technology.

Hereafter, more detailed description will be given to the constitution of the detection circuit 20 with reference to FIG. 2. The detection circuit 20 includes as substantial parts the charge-voltage conversion circuit 21, a signal processing circuit 22, a control signal generation circuit 24, and a microcomputer 53. The charge-voltage conversion circuit 21 comprises an operational amplifier 21a provided with a negative feedback capacitor 21b for charge detection. The movable electrodes 2d are connected to the inverting input terminal of the operational amplifier 21a. Thus, change in the charge output of the detection capacitors 10a, 10b is inverted and inputted, and, after conversion into voltage, outputted as an acceleration signal. Further, a discharge switch 21c is provided for discharging the charges stored in the negative feedback capacitor 21b. In this embodiment, a short-circuiting path 21s is provided for short-circuiting both the ends of the negative feedback capacitor 21b, and the discharge switch 21c is provided in this short-circuiting path 21s.

The signal processing circuit 22 is also designated as sample and hold circuit (hereafter, also referred to as "S&H circuit") 22a, an amplifier circuit (AMP) 22b, and a low-pass filter (LPF) circuit 22c. The S&H circuit 22a samples the output voltage of the charge-voltage conversion circuit 21, holds it for a certain period, and outputs the difference between it and an immediately preceding output voltage. The amplifier circuit 22b amplifies the output voltage of the S&H circuit 22a to a predetermined sensitivity. The low-pass filter circuit 22c functions to extract only components of predetermined frequency bands from the acceleration output voltage of the amplifier circuit 22b. The S&H circuit 22a has a publicly known constitution comprising operational amplifiers 221a and 221b that constitute a voltage follower, a switch 221d, and a capacitor 221c. The signal processing circuit 22 and the charge-voltage conversion circuit 21 constitute the acceleration signal generation circuit.

The control signal generation circuit 24 generates pulse carrier signals P1 and P2, a switch driving signal S2, and another switch driving signal S1. The pulse carrier signals P1 and P2 are for applying bias voltage for detection whose polarity is periodically inverted to both the ends of the detection capacitors 10a, 10b. The switch driving signal S2 drives the switch 221d for sampling acceleration signals. The switch driving signal S1 drives the discharge switch 21c to periodically discharge the charges in the negative feedback capacitor 21b of the charge-voltage conversion circuit 21 as required. The control signal generation circuit 24 generates these signals according to a clock signal CK from a clock circuit 25.

The above control signal generation circuit 24 constitutes the following means:

The control signal generation circuit 24 functions as a bias voltage applying means that applies a bias voltage for detection between the first fixed electrodes 3 and the second fixed electrodes 4 of the detection capacitors 10a, 10b.

Figure 3:
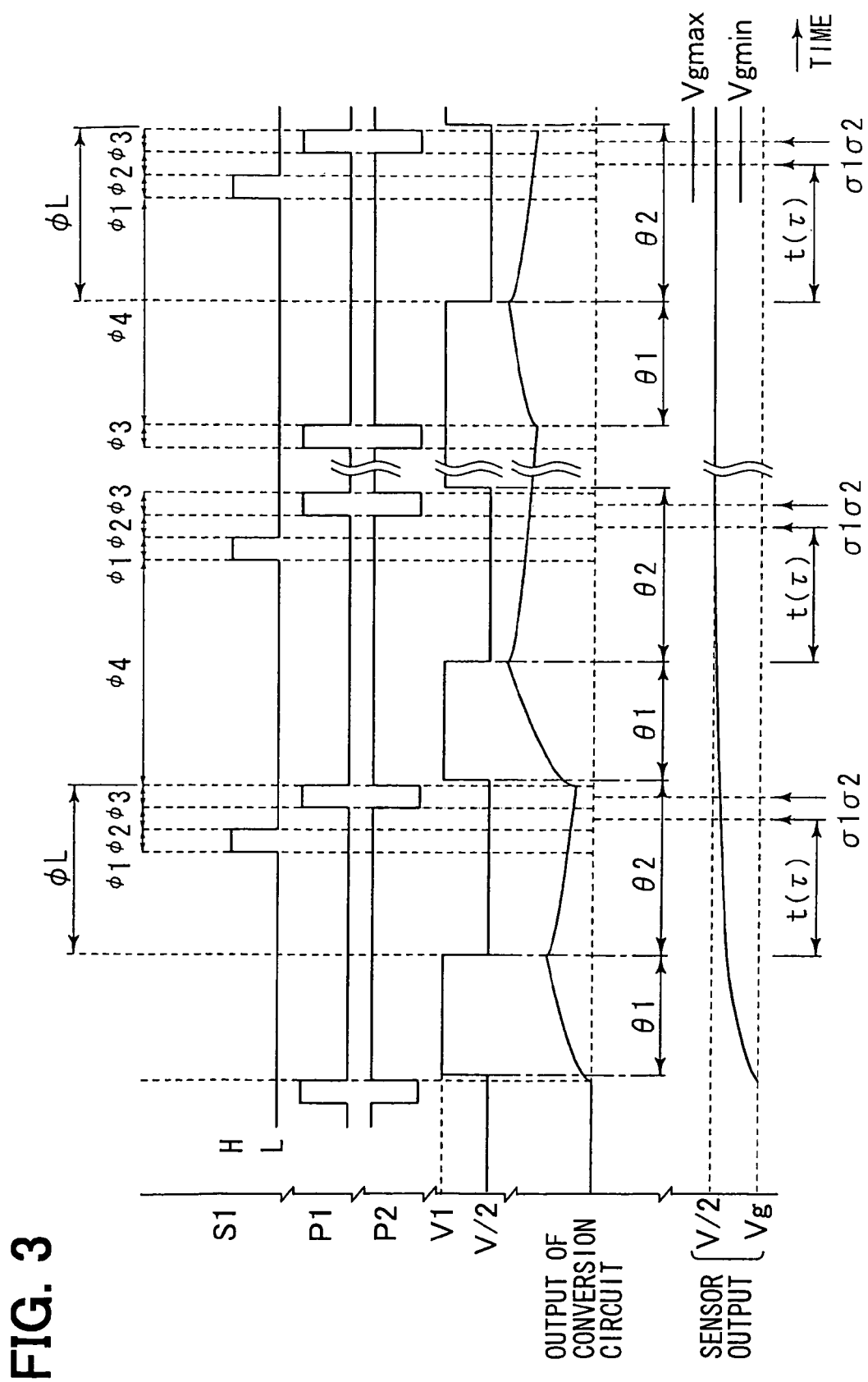
FIG. 3 is a timing chart explaining operation of the system according to the first embodiment.

The control signal generation circuit 24 as a forcedly vibrating means constantly repeats a vibration cycle. In the vibration cycle, the following operation is performed: with bias voltage for detection V (−V when inverted) applied to the detection capacitors 10a, 10b, displacement bias voltage is applied to the movable electrodes 2d. The displacement bias voltage is for forcedly displacing the movable electrodes 2d from neutral positions toward the direction of acceleration detection. The neutral positions are located between the first fixed electrodes 3 and the second fixed electrodes 4 and correspond to the state of non-detection of acceleration. Thereafter, the application of displacement bias voltage is canceled. The circuit 24 constantly repeats the vibration cycle and thereby forcedly vibrates the movable electrodes 2d toward the direction of acceleration detection. In this embodiment, as illustrated in FIG. 3, switching between the period θ1 in which displacement bias voltage is applied and the period θ2 in which the application of displacement bias voltage is canceled is carried out as follows: the level of bias voltage applied to the movable electrodes 2d is changed by virtual short-circuiting through the non-inverting input terminal of the operational amplifier 21a in the charge-voltage conversion circuit 21. With this method, the level of applied bias voltage can be stabilized by the interposition of the operational amplifier 21a. In this embodiment, when the input voltage to the non-inverting input terminal of the operational amplifier 21a is V, a displacement bias voltage of V/2 is applied to the movable electrodes 2d; when the input voltage is V/2, the application of displacement bias voltage to the movable electrodes 2d is canceled. A switch circuit 23 comprises a switch 23a and another switch 23b provided in the input paths for respective voltages. The input voltages (correspond to V and V/2) are alternated according to switch driving signals S3 from the control signal generation circuit 24. With respect to either voltage, the signal is inverted through an inverter 23c. This alternation is carried out with the above-mentioned periods θ1 and θ2 taken as one cycle.

The microcomputer 53 has an A/D conversion port AD1 for inputting the acceleration signal Vg from the signal processing circuit 22. The microcomputer 53 also has a signal output port D1 for outputting the acceleration signal Vg and a signal output port D2 for outputting an anomaly detection signal VD.

Description will be given to the operation of an acceleration sensor system constructed as mentioned above with reference to a signal waveform diagram in FIG. 3. The carrier signals P1 and P2 that are outputted from the control signal generation circuit 24 and provide bias voltages for detection V and −V are constituted as illustrated in FIG. 2. That is, the carrier signals P1 and P2 are constituted as rectangular pulse signals of constant amplitude (i.e., a voltage amplitude is defined as V) whose level changes between high level (Hi) and low level (Lo) in four periods ($\phi$1 to $\phi$4). The carrier signal P2 is a signal obtained by inverting the voltage level of the carrier signal P1.

In periods $\phi$4, $\phi$1, and $\phi$2, the carrier signal P1 is at a second level (hereafter, notated as "L") lower than a threshold value, and the carrier signal P2 is at a first level (hereafter, notated as "H") higher than the threshold value. That is, bias voltage for detection of +V is applied to the detection capacitors 10a, 10b so that the potential on the first fixed electrode 3 side is increased. In period $\phi$3, the carrier signal P1 is brought to H and the carrier signal P2 is brought to L so that the polarity of the bias voltage for detection is inverted. In period $\phi$1, the discharge switch 21c is closed according to the switch driving signal S1 from the control signal generation circuit 24. As a result, a voltage of V/2 is applied to the non-inverting input terminal of the operational amplifier 21a, and a voltage of V/2 is applied to the movable electrodes 2d. Further, the charges in the capacitor 21b are discharged. At this time, the output Vs of the charge-voltage conversion circuit 21 is reset to V/2.

When the capacitance C1 of the detection capacitors 10a and the capacitance C2 of the detection capacitors 10b are in the relation expressed as C1>C2, the following occurs: in period $\phi$2 for which the fixed electrode 3 side is at L, with respect to applied voltage, the divided voltage is higher in the L-side detection capacitors 10b. Thus, the movable electrodes 2d are brought into a state in which positive electric charges are higher in quantity. (The reverse occurs when C1<C2.) In period $\phi$2, the polarity of bias voltage for detection applied to the detection capacitors 10a, 10b is unchanged. When the discharge switch 21c is opened according to the switch driving signal S1, charge transfer occurs between the charges of the movable electrodes 2d and the negative feedback capacitor 21b. A voltage value Vg1 corresponding to the state of charge balance is outputted from the charge-voltage conversion circuit 21. This output value is sampled and held at the S&H circuit 22a by turning on and off the switch 221d according to the switch driving signal S2 with predetermined timing.

In period $\phi$3 in FIG. 3, the voltage level of the carrier signals P1 and P2 is inverted. (P1 is inverted to H and P2 is inverted to L.) The discharge switch 21c is kept open according to the switch driving signal S1. The state of charge of the movable electrodes 2d is reversed from that in period $\phi$2 by inversion of the carrier signals P1 and P2. When the relation expressed as C1>C2 holds, as mentioned above, the movable electrodes 2d are brought into a state in which negative electric charges are higher in quantity by inversion of the voltage applied to the fixed electrodes 2a and 2b. However, since the portion between the movable electrodes 2d and the capacitor 21b is a closed circuit and the electric charges in period $\phi$1 are held, the following occurs: electric charges that leak out of the movable electrodes 2d because of imbalance of the amount of charges transfers to the capacitor 21b and are stored there. When the capacitance of the capacitor 21b is constant, a voltage value Vg2" in proportion to the amount of the above-mentioned charge transfer is outputted from the charge-voltage conversion circuit 21 because of the relation expressed as Q=CV. In period $\phi$3 as well, the value is sampled through the S&H circuit 22a with predetermined timing. The difference between the output value Vg1 sampled in period $\phi$2 and the output value vg2 sampled in period $\phi$3 is subjected to computation in the microcomputer 53. Both the output values are those that have passed through the amplifier circuit 23b and the LPF (i.e., low pass filter) 22c. The value obtained by this computation is outputted as an acceleration output value Vg corresponding to displacement in the movable electrodes 2d.

In the above-mentioned measurement, the movable electrodes 2d of the detection capacitors 10a, 10b are subjected to the following operation by the switch circuit 23 that received the switch driving signal S3: in period θ1 in FIG. 3, displacement bias voltage is applied; in the subsequent period θ2, the application of displacement bias voltage is canceled. The vibration cycle consisting of θ1+θ2 is stationarily repeated, and the movable electrodes 2d are thereby forcedly vibrated toward the direction of acceleration detection. Both periods $\phi$2 and $\phi$3 in which the output of the charge-voltage conversion circuit 21 is sampled for acceleration detection belong to the period θ2 for which the application of displacement bias voltage is canceled.

More specific description will be given. In normal operation mode related to acceleration detection, the vibration cycle is constantly repeated. In this vibration cycle, a forced displacement force is forcibly applied as vibration to the movable electrodes 2d of the detection capacitors 10a, 10b; thereafter, the application of displacement force is canceled.

With this vibration cycle constantly repeated, the acceleration signal is sampled. By this forced vibration, a kind of constant false, simulated, or pseudo-acceleration is applied to the movable electrodes 2d, which acts, for example, like a bias. In the period θ1 for which displacement bias voltage is applied, however, displacement force other than acceleration to be detected is applied to the movable electrodes 2d. Therefore, acceleration detection cannot be carried out. Consequently, sampling for acceleration detection is carried out only for period θ2 for which the application of displacement bias voltage is canceled. As a result, the following advantage is brought: even during acceleration detection, bias displacement constantly occurs in the movable electrodes 2d. Therefore, when the displacement rigidity, which refers to, for example, the displaceability and can be likened to a spring constant, or the like, of the movable electrodes 2d becomes abnormal due to the influence of breakage, lodging of foreign matter, or the like, fluctuation arising from the anomaly immediately and noticeably occurs in acceleration output. Thus, the sensitivity in detecting the occurrence of anomalies and continuous monitorability are significantly enhanced.

As illustrated in FIG. 3, when a forced displacement force is applied in period θ1, which results in an apparent effect that is equivalent to an increase in acceleration and which is referred to herein as "apparent acceleration", the output of the charge-voltage conversion circuit 21 is increased. When the application of the forced displacement force is canceled in period θ2, the movable electrodes 2d dampingly vibrates and reduces displacement. Therefore, the output of the charge-voltage conversion circuit 21 is gradually reduced. As seen from the output value at the starting point of the next vibration cycle, however, the next forced displacement is applied before the amplitude of the damped vibration does not lower so much. As a result, when consideration is given to only to the period θ2 for which application is canceled and acceleration detection is carried out, the acceleration has an appearance of being biased by residual damped vibration in this period. When the time τ from when the application of forced displacement force is canceled to when sampling is carried out is managed, the value of this acceleration bias or residual bias, which is referred to as "bias acceleration," during sampling can be controlled to a substantially constant value. That is, transient damped vibration of the movable electrodes 2d arising from canceling of the application of acceleration forced displacement is willingly utilized. Thus, the effect of it being stabilized in the form of acceleration bias is achieved. Thus, the zero point of sensor output is further stabilized, and the accuracy of acceleration detection can also be enhanced.

Adoption of the above-mentioned system brings the following advantage: without application of acceleration, the application cancel period θ2 is changed to the next application period θ1. As illustrated in FIG. 3, the output of the charge-voltage conversion circuit 21 immediately before this change is gradually increased with repetition of vibration cycle. Thereafter, the output is stabilized to a constant value. As illustrated at the lowest part of FIG. 3, the zero point of sensor output is gradually increased in the initial stage. After a while, the output is brought into a condition of equilibrium at a value close to V/2. This value is equal to the value of displacement bias voltage. By carrying out sampling for acceleration detection in this state in which the zero point is in equilibrium, the accuracy of acceleration detection can be further enhanced. It is desirable that offset adjustment should be made prior to shipment so that Vg will be V/2.

In the control signal generation circuit 24 that constitutes the bias voltage for detection applying means, the timing of the signals P1, P2, S1, and S3 are set as illustrated in FIG. 3. A first period and a second period are set in the vibration cycle. In the first period φ4+φ1+φ2, a first polarity is taken as the polarity of bias voltage for detection in the period θ2 for which the application of displacement bias voltage is canceled. In the second period φ3 subsequent to the first period φ4+φ1+φ2, a second polarity opposite the first polarity is taken as the polarity of bias voltage for detection. The S&H circuit 22a that constitutes the sampling means carries out first sampling σ1 according to the signal S2 in the first period φ4+φ1+φ2. Subsequently, the S&H circuit 22a carries out second sampling σ2 in the second period φ3. The microcomputer 53 that constitutes the acceleration signal generating and outputting means generates the acceleration signal Vg based on the difference between these two sampling values σ1 and σ2 of the output of the charge-voltage conversion circuit 21. Then the microcomputer 53 outputs the acceleration signal Vg. As mentioned above, the difference between the two output values is obtained by carrying out measurement with the polarity of bias voltage for detection varied. Thus, the influence of stray capacitance and the like contained in the detection circuit 20 can be canceled, and the accuracy of acceleration detection can be enhanced.

More specifically, in the control signal generation circuit (i.e., the bias voltage for detection applying means) 24, the following are set: the first period φ4+φ1+φ2 in which the first polarity is taken as the polarity of bias voltage for detection; and the second period φ3, subsequent to the first period φ4+φ1+φ2, in which the second polarity opposite the first polarity is taken. The period θ1 for which displacement bias voltage is applied is started in the first period φ4+φ1+φ2. Then the application period θ1 is changed to the application cancel period θ2 before the first period φ4+φ1+φ2 ends. After the change to the application cancel period θ2, the first sampling value σ2 is carried out in the remaining period φL of the first period φ4+φ1+φ2. Subsequently, the second sampling value σ2 is carried out in the second period φ3. This means the following: in the application period θ1, a preparation period φ4 is provided before the period φ1 in which acceleration measurement (sampling) is started. In this period, change between the application period θ1 and the application cancel period θ2 is carried out. This brings the advantage that the influence of this change is less prone to reach acceleration measurement.

This effect is further enhanced by making the setting of the first period φ4+φ1+φ2 longer than that of the second period φ3. As mentioned above, after the change to the application cancel period θ2 and a certain wait time τ has passed, the first sampling value σ1 can be carried out. Thus, the state of vibration produced in the movable electrodes due to canceling of the application of forced displacement force is stabilized, and more stable acceleration detection can be carried out.

In this embodiment, the microcomputer 53 constitutes an acceleration signal generating means that computes the difference between the first sampling value σ1 and the second sampling value σ2. Instead, an acceleration signal generating means as hardware may be provided without use of a microcomputer. For example, the first sampling value al and the second sampling value σ2 may be held at separate S&H circuits; each hold value may be subjected to difference computation through a differential amplifier circuit or the like to generate an acceleration signal. When anomaly determination according to the generated acceleration signal is carried out in a determination system external to the acceleration sensor system in this case, the microcomputer 53 itself can be omitted.

Thus, an acceleration sensor system according to the first embodiment of the present invention is characterized in that it comprises: the detection capacitors 10a, 10b, the charge-voltage conversion circuit 21, the control signal generation circuit 24 as the bias voltage for detection applying means, the control signal generation circuit 24 as the forcedly vibrating means, the S&H circuit 22a as the sampling means, and the microcomputer 53 as the acceleration signal generating and outputting means.

The detection capacitors 10a, 10b are so constructed that movable electrodes 2d are disposed between first fixed electrode 3 and second fixed electrodes 4. A first capacitor formed by the first fixed electrode 3 and the movable electrodes 2d and a second capacitor formed by the movable electrodes 2d and the second fixed electrodes 4 are connected in series with each other. Based on displacement in the movable electrodes 2d due to acceleration application, the capacitance of the first capacitor and that of the second capacitor are varied in conjunction with each other.

The charge-voltage conversion circuit 21 converts change in the capacitance of the detection capacitors based on the output of the acceleration movable electrodes into voltage, and outputs it.

The bias voltage for detection applying means applies bias voltage for detection to between the first fixed electrodes 3 and the second fixed electrodes 4 of the detection capacitors 10a, 10b.

The forcedly vibrating means stationarily repeats a vibration cycle. The vibration cycle is as follows: with bias voltage for detection applied to the detection capacitors 10a, 10b, displacement bias voltage is applied to the movable electrodes 2d. This displacement bias voltage is for forcedly displacing the movable electrodes 2d from the neutral positions between the first fixed electrodes 3 and the second fixed electrodes 4 toward the direction of acceleration detection. The neutral position corresponds to the state of non-detection of acceleration. Thereafter, the application of displacement bias voltage is canceled. The forcedly vibrating means forcedly vibrates the movable electrodes 2d toward the direction of acceleration detection by repeating the vibration cycle.

The sampling means samples the output of the charge-voltage conversion circuit 21 for acceleration detection. With forced vibration stationarily applied to the movable electrodes 2d, the sampling means selectively samples the output in periods for which the application of displacement bias voltage is canceled in the vibration cycle.

The acceleration signal generating and outputting means generates and outputs acceleration signals based on the result of the sampling.

According to the above-mentioned constitution of the first embodiment of the present invention, self-diagnosis mode and acceleration detection mode are not discriminated from each other in terms of period, compared with the prior art. The first embodiment of the present invention is characterized in that: in normal operation mode related to acceleration detection, the vibration cycle is stationarily repeated. In the vibration cycle, displacement bias voltage is applied for forcedly displacing the movable electrodes of the detection capacitors from the neutral positions toward the direction of acceleration detection; thereafter, the application of the displacement bias voltage is canceled. More specific description will be given. Conventionally, self-diagnosis period is separately provided, and false acceleration is intermittently applied to movable electrodes only in the self-diagnosis periods. According to the first embodiment of the present invention, the self-diagnosis period is eliminated. Instead, in normal acceleration detection periods, false acceleration is constantly (that is, "stationarily") applied to the movable electrode by the above-mentioned forced vibration like a bias. However, acceleration detection cannot be carried out while displacement force is applied to the movable electrodes by displacement bias voltage. Therefore, sampling for acceleration detection is carried out only for periods for which the application of displacement bias voltage is canceled, that is, periods for which forced displacement force is not applied.

As a result, the following advantage is brought: bias displacement constantly occurs in the movable electrodes even during acceleration detection. Therefore, when the displacement rigidity of the movable electrodes becomes abnormal due to the influence of breakage, lodging of foreign matter, or the like, fluctuation arising from the anomaly immediately and noticeably occurs in acceleration output. Thus, the sensitivity in detecting the occurrence of anomalies and continuous monitorability are significantly enhanced.

As mentioned above, the conventional constitutions involve the following problem: when the mode is changed to acceleration detection mode in which false acceleration is not applied, the zero point of a sensor is caused to fluctuate by damped vibration of the movable electrodes arising from canceling of forced displacement. Even in the first embodiment of the present invention, the movable electrodes develop damped vibration when forced displacement force is removed. However, the next forced displacement is applied before the amplitude of the damped vibration does not lower so much. This is a great difference from the conventional constitutions. As a result, when consideration is given to the period for which the application of displacement bias voltage is canceled for carrying out acceleration detection, the acceleration is apparently biased by residual damped vibration. More specific description will be given. Conventionally, transient damped vibration of movable electrodes arising from canceling of forced displacement should be eliminated as much as possible from the viewpoint of detection accuracy enhancement. In the present invention, the transient damped vibration is willingly utilized on the contrary, and it is stabilized in the form of acceleration bias. As a result, the zero point of sensor output is further stabilized, and the accuracy of acceleration detection can also be enhanced.

The above-mentioned forcedly vibrating means is capable of stabilizing the output of the charge-voltage conversion circuit to a constant output by appropriately determining the length of the period for which the application of displacement bias voltage is canceled. Without the application of acceleration, the period for which the application of displacement bias voltage is canceled is changed to the next period for which displacement bias voltage is applied. After the output of the charge-voltage conversion circuit immediately before this change is gradually increased with repetition of the vibration cycle, the forcedly vibrating means stabilizes the output. When an acceleration sensor constructed as mentioned above is started, the following occurs: in the initial stage in which the application of vibration cycle to the movable electrodes is started, the state of static electrification based on the stray capacitance produced in the circuits or enclosure of the sensor system is unstable. Also, the characteristics of active elements such as operational amplifiers in the circuits are in transient state. As a result, the state of acceleration bias to the movable electrodes (then the zero point of sensor output) undergoes transient fluctuation. However, as the vibration cycle is repeated, acceleration bias gradually approaches steady state, and the zero point of sensor output is stabilized. By carrying out sampling for acceleration detection in this stable state, the accuracy of acceleration detection can be further enhanced.

Second Embodiment

Figure 4:
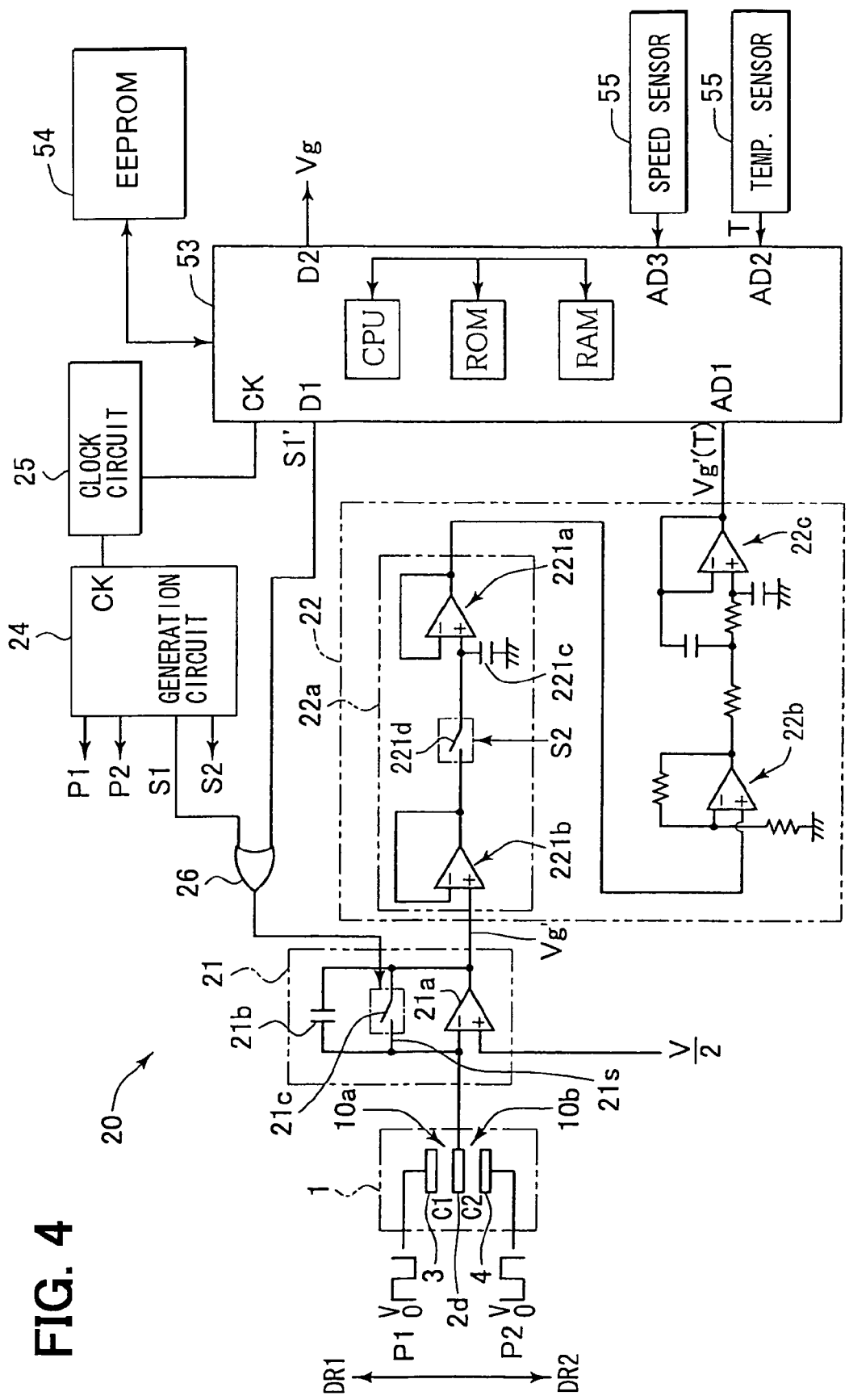
FIG. 4 is a circuit diagram showing an acceleration sensor system according to a second embodiment of the present invention.

Another detection circuit 20 according to a second embodiment of the present invention is described with reference to FIG. 4. The detection circuit 20 includes as substantial parts the charge-voltage conversion circuit 21, the signal processing circuit 22, the control signal generation circuit 24, and the microcomputer 53. The charge-voltage conversion circuit 21 comprises the operational amplifier 21*a* provided with the negative feedback capacitor 21*b* for charge detection. Change in the charge output of the detection capacitors 10*a* and 10*b* is inverted and inputted. The charge-voltage conversion circuit 21 thereby converts it into voltage and outputs it as an acceleration signal. The inverting input terminal of the operational amplifier 21*a* is connected to the movable electrodes 2*d*. When V is taken as bias voltage for detection to the detection capacitors 10*a* and 10*b*, a voltage of V/2 is inputted to the non-inverting input terminal of the operational amplifier 21*a*. Further, the short-circuiting path 21*s* is provided for short-circuiting both the ends of the negative feedback capacitor 21*b*. The switch 21*c* for short-circuiting the negative feedback capacitor (hereafter, simply referred to as "switch 21*c*") is provided in the short-circuiting path 21*s*.

The microcomputer 53 forms a substantial part of a zero point correcting means. The microcomputer 53 has the following ports: the A/D conversion portion AD1 for inputting an uncorrected acceleration signal Vg' (T) from the signal processing circuit 22; and the A/D conversion port AD2 through which detection output is inputted from a temperature sensor 55 for detecting the temperature of the periphery of the sensor unit. The microcomputer 53 also has a signal output port D1, a signal output port D2, and the like. The signal output port D1 outputs a switch driving signal S1 for check with predetermined check timing. This output is carried out for correcting zero point drifts in the uncorrected acceleration signal Vg' (T) from the charge-voltage conversion circuit 21. (The signal processing circuit 22 positioned downstream therefrom is included.) The output is carried out independently of the switch driving signal S1 from the control signal generation circuit 24. The signal output port D2 outputs a corrected acceleration signal Vg.

The microcomputer 53 is connected with EEPROM (Electrically Erasable Programmable ROM) 54 that constitutes a standard offset output value storage unit. The EEPROM 54 stores the standard value Vk(T0) of the offset output Vk of the charge-voltage conversion circuit 21 when the negative feedback capacitor 21*b* is short-circuited. (The standard offset output value may be an offset output value Vg' (T) from the signal processing circuit 22 positioned downstream.) The EEPROM 54 also stores a correction table 54*a* in which the coefficients (α and β) of correction for temperature of the acceleration signal Vg are stored with respect to each of various temperatures. Correction of the acceleration signal Vg by the thus constructed microcomputer 53 is carried out by CPU executing the following: the CPU executes a control program stored in ROM in the microcomputer using RAM as a work area in accordance with the flowcharts in FIG. 6 and FIGS. 7A to 7D.

Description will be given to the operation of the thus constructed acceleration sensor system with reference to a signal waveform diagram in FIG. 5. The carrier signals P1 and P2 for supplying bias voltage for detection are outputted from the control signal generation circuit 24. As illustrated in FIG. 4, the carrier signals P1 and P2 are constituted as rectangular pulse signals of constant amplitude (voltage amplitude: V) whose level changes between high level (Hi) and low level (Lo) in four periods (φ1 to φ4). The carrier signal P2 is a signal obtained by inverting the voltage level of the carrier signal P1.

First, description will be given to normal operation with reference to FIGS. 7A to 7D. In periods φ1 and φ2, the carrier signal P1 is at Hi (5V), and the carrier signal P2 is at Lo (0V). In period θ1, the switch 21*c* is closed according to the switch driving signal S1 from the control signal generation circuit 24. As a result, a voltage of V/2 is applied to the non-inverting input terminal of the operational amplifier 21*a*, and a voltage of V/2 is applied to the movable electrodes 2*d*. Further, the charges in the capacitor 21*b* are discharged. At this time, the output Vs of the charge-voltage conversion circuit 21 is reset to V/2.

When the capacitance C1 of the detection capacitors 10*a* and the capacitance C2 of the detection capacitors 10*b* are in the relation expressed as C1>C2, the following occurs: in period φ1 for which the fixed electrode 3 side of the detection capacitors 10*a* is at Hi, with respect to applied voltage, the divided voltage is lower in the Hi-side detection capacitors 10*a*. Thus, the movable electrodes 2*d* are brought into a state in which negative electric charges are higher in quantity. (The reverse occurs when C1<C2.) In period φ2, the polarity of bias voltage for detection applied to the detection capacitors 10*a* and 10*b* is unchanged, and meanwhile, the switch 21*c* is opened according to the switch driving signal S1. Thus, charge transfer occurs between the charges of the movable electrodes 2*d* and the negative feedback capacitor 21*b*. A voltage value Vg1" corresponding to the state of charge balance is outputted from the charge-voltage conversion circuit 21. This output value is sampled and held at the S&H circuit 22*a* by turning on and off the switch 221*b* according to the switch driving signal S2 with predetermined timing.

Figure 5:
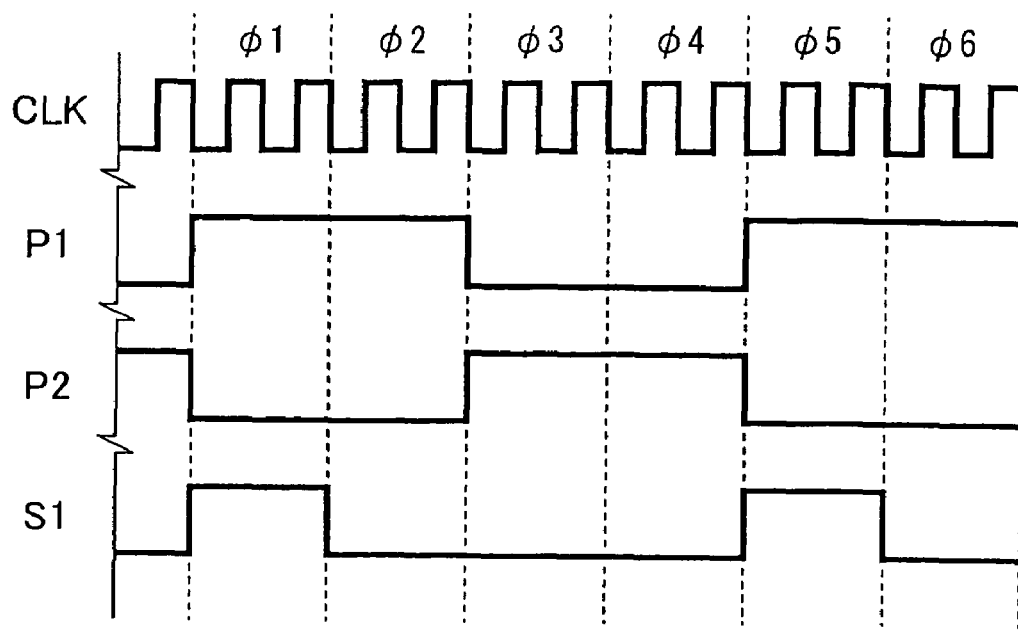
FIG. 5 is a timing chart explaining operation of the system according to the second embodiment.

In period φ3 in FIG. 5, the voltage level of the carrier signals P1 and P2 is inverted. (P1 is inverted to Lo and P2 is inverted to H.) The switch 21*c* is kept open according to the switch driving signal S1. The state of charge of the movable electrodes 2*d* is reversed from that in period φ2 by inversion of the carrier signals P1 and P2. When the relation expressed as C1>C2 holds, as mentioned above, the movable electrodes 2*d* are brought into a state in which positive electric charges are higher in quantity by inversion of the voltage applied to the fixed electrode 2*a* and 2*b*. However, since the portion between the movable electrodes 2*d* and the capacitor 21*b* is a closed circuit and the electric charges in period φ1 are held, the following occurs: electric charges that leak out of the movable electrodes 2*d* because of imbalance of the amount of charges transfers to the capacitor 21*b* and are stored there. When the capacitance of the capacitor 21*b* is constant, a voltage value Vg2" in proportion to the amount of the above-mentioned charge transfer is outputted from the charge-voltage conversion circuit 21 because of the relation expressed as Q=CV. Period φ4 is a wait period for stabilizing the voltage value Vg2", and this value is sampled through the S&H circuit 22*a* with predetermined timing with which Vs2 is sufficiently stabilized.

The difference between the output value Vg1' sampled in period φ2 and the output value Vg2' sampled in period φ4 is subjected to computation in the microcomputer 53. (Both the output values are those that have passed through the amplifier circuit 23b and the LPF circuit 23c.) The value obtained by this computation is outputted as an acceleration output value Vg corresponding to displacement in the movable electrodes 2d. In this embodiment, the microcomputer 53 computes the difference between the first sampling value Vg1' and the second sampling value Vg2'. Instead, the following constitution in which difference computation is not carried out by the microcomputer may be adopted: the first sampling value Vg1' and the second sampling value Vg2' are held at separate S&H circuits; each hold value is subjected to difference computation through a differential amplifier circuit or the like to generate an acceleration signal.

With respect to both the above-mentioned Vg1' and Vg2', there is a problem. The offset output on which the acceleration waveform to be detected is based can vary due to the following: the deterioration with age of the charge-voltage conversion circuit 21, the amplifier circuit 23b positioned downstream therefrom, or the LPF 22c; sensor environmental temperature; bias due to gravitational acceleration on a sloping ground; or the like. This variation can become a cause of errors in acceleration detection. When the switch 21c is closed and both the ends of the negative feedback capacitor 21b are short-circuited in the circuit in FIG. 4, the charge-voltage conversion circuit 21 becomes substantially the same circuit as a voltage follower. Theoretically, an input voltage of V/2 to the non-inverting terminal is taken as zero point voltage, and offset voltage specific to the circuit is outputted. The present offset output can be learned by reading this output.

For example, the following measures are taken before the sensor system is mounted: the offset output value is measured by the above-mentioned method in state of rest at standard temperature T0 (e.g. 20° C.). It is written as standard offset output value VF(T0) into the EEPROM 54. After use of the sensor system is started, the offset output value can be varied (that is, the zero point drifts) due to the following factors: deterioration with age in the acceleration signal generation circuit including the charge-voltage conversion circuit 21, and change in ambient temperature. When the offset output value is varied, the amount of an zero point drift can be grasped by measuring the offset output value VF(T) as needed, and comparing the measured value with the above-mentioned standard offset output value VF(T0). Thus, the acceleration signal can be corrected in correspondence with the grasped amount of the zero point drift.

The measurement of offset output value VF(T) is carried out, for example, when the vehicle is at a stop. As illustrated in FIG. 4, in this case, whether the vehicle is at a stop or running can be determined by obtaining vehicle speed information from a vehicle speed sensor 55. When the offset output VF(T) is measured when the engine is started, however, vehicle speed information becomes unnecessary. Specifically, the following operation is performed: on receipt of an engine start signal, the microcomputer 53 determines it as check timing, and outputs a drift check signal S1' through the signal output port D1. The drift check signal S1' is subjected to logical OR operation, together with the switch driving signal S1 for resetting the charges of the negative feedback capacitor 21, at a gate 26. The logical sum is inputted to the switch 21c, which is then closed. At this time, the output of the charge-voltage conversion circuit 21 gives the offset output value, that is, the current offset output value VF(T) with the above-mentioned check timing. Therefore, it can be sampled through the S&H circuit 22a.

With respect to both the sampled acceleration signal output values Vg1' and Vg2', the above-mentioned correction can be carried out in the microcomputer 53 by software. (Hereafter, both the acceleration signal output values will be denominated as Vg' (T) to collectively refer to them and to indicate that the value is one at temperature T.) The object is to convert the uncorrected acceleration signal output value Vg' (T) whose zero point has drifted at arbitrary temperature T into the acceleration signal value vg(T0) whose zero point has not drifted at standard temperature T0. Letting the amount of a zero point drift at the present temperature T be Vk(T), the uncorrected acceleration signal output value Vg' (T) is expressed by the following expression:

$$Vg'(T) = \alpha(\Delta T) \times Vg(T0) + Vk(T) \qquad (1)$$

where, ΔT is the temperature difference between standard temperature T0 and present temperature T; and α(ΔT) is the temperature coefficient of Vg(T0) experimentally determined according to the temperature difference ΔT. The value of ΔT can be computed by acquiring the measured temperature value T from the temperature sensor 55 in FIG. 4.

The amount of zero point drift Vk(T) is a value indicating to what extent the current offset output value VF(T) has been varied relative to the standard offset output value VF(T0). The standard offset output value VF(T0) can also be expressed by the following expression by subjecting it to correction for temperature:

$$Vk(T) = VF(T) - \alpha(\Delta T) \times VF(T0) \qquad (2)$$

According to (1) and (2) above, Vg(T0) can be expressed as follows:

$$\begin{aligned} Vg(T0) &= \{Vg'(T) - Vk(T)\}/\alpha(\Delta T) \qquad (3) \\ &= [Vg'(T) - \{VF(T) - \alpha(\Delta T) \times VF(T0)\}]/\alpha(\Delta T) \end{aligned}$$

Figure 6:
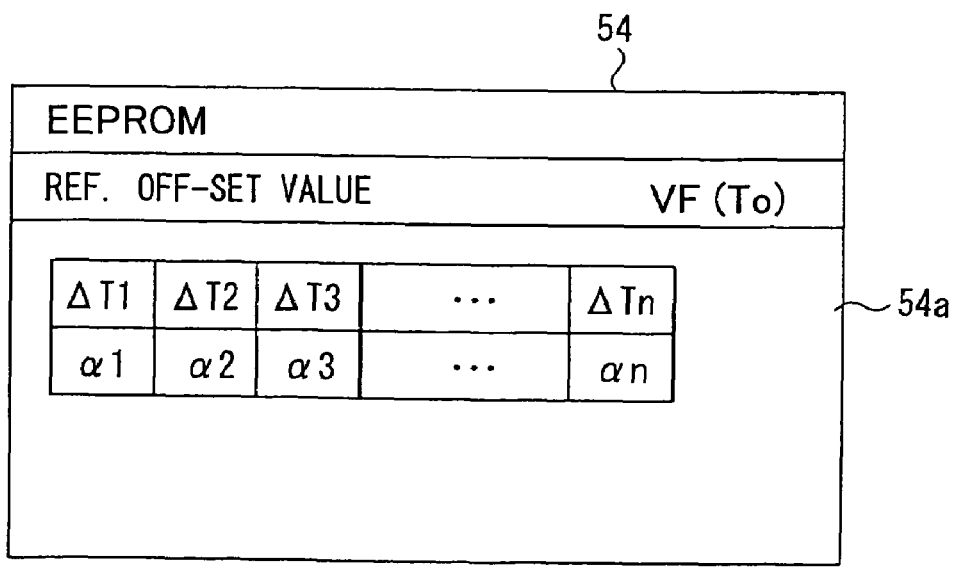
FIG. 6 is a table explaining a memorized content of a EEPROM in the system according to the second embodiment.
Figure 7A:
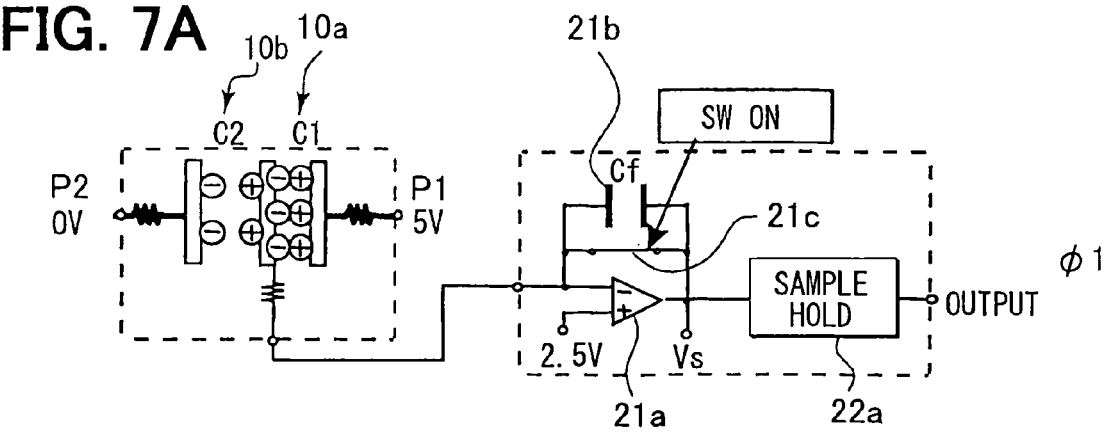
FIGS. 7A to 7D are schematic views explaining operation of the system according to the second embodiment.
Figure 7B:
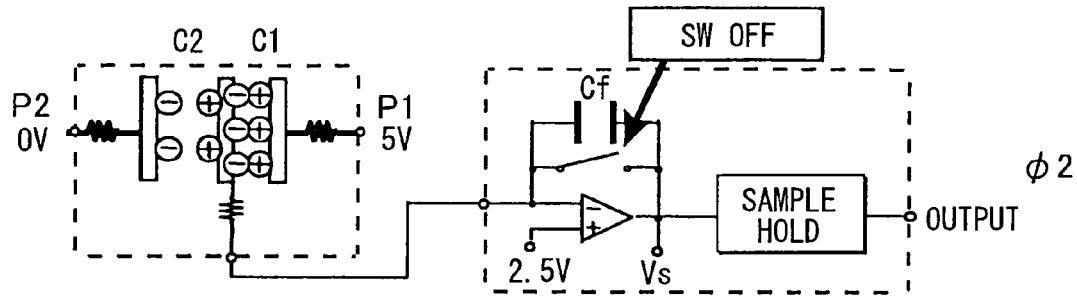
Figure 7C:
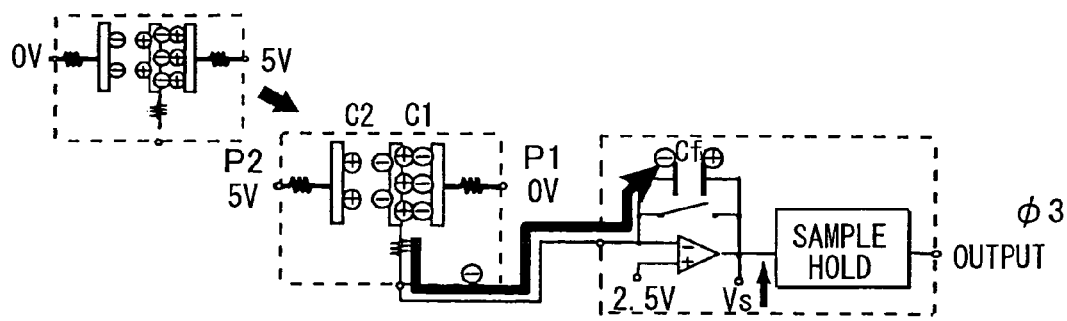
Figure 7D:
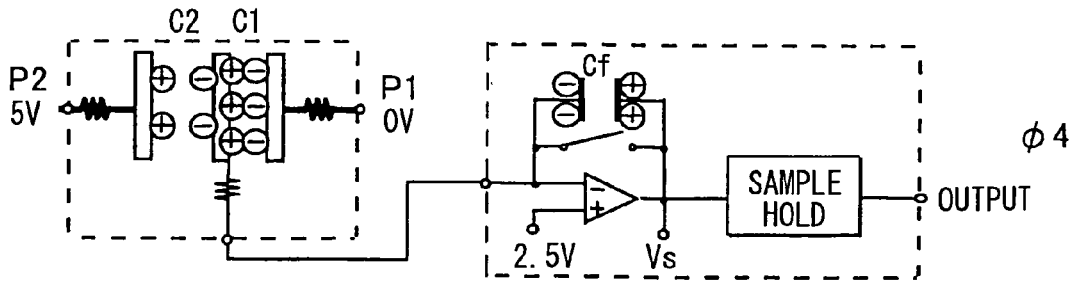

The value of α(ΔT) in Expression (3) is experimentally determined with respect to each of various temperature differences ΔT. Then, it is stored in the EEPROM 54 in the form of temperature coefficient table as the correction table 54a (constituting correction information), as illustrated in FIG. 6. With respect to VF(T0), values measured before the sensor system is shipped are stored in the EEPROM 54. Therefore, the following can be implemented by measuring the present offset output VF(T) in a state in which acceleration is not produced: Vg' (T) obtained directly from the acceleration signal generation circuit is corrected to compute the acceleration signal value Vg(T0) to be finally obtained according to the above-mentioned α(ΔT), VF(T), and Vk(T0).

Thus, the acceleration sensor system for vehicles according to the second embodiment of the present invention is characterized in that it comprises the detection capacitors 10a, 10b, the charge-voltage conversion circuit 21, the EEPROM 54 as the standard offset output value storage unit, and the microcomputer 53 as the zero point correcting means.

The detection capacitors 10a, 10b vary the distance between electrode plates under application of acceleration.

The charge-voltage conversion circuit 21 comprises the operational amplifier 21a provided with the negative feedback capacitor 21b or charge detection. The charge-voltage conversion circuit 21 is fed with inverted change in the charge output of the detection capacitors 10a, 10b, coverts it into voltage, and outputs it as an acceleration signal.

The standard offset output value storage unit stores standard offset output values that are standard values for the offset output of the acceleration signal generation circuit composed of the signal processing circuit 22 and the charge-voltage conversion circuit 21, when both the ends of the detection capacitors are short-circuited.

The zero point correcting means short-circuits both the ends of the negative feedback capacitor 21b with predetermined check timing when the sensor is in use. In this state, the correcting means detects the offset output of the acceleration signal generation circuit as a current offset output value. Then, the correcting means corrects the zero point of acceleration signal based on the comparison of the standard offset output value with the current offset output value.

According to the above-mentioned constitution of the second embodiment of the present invention, for example, the following measures are taken before the sensor system is shipped: both the ends of the negative feedback capacitor 21b of the charge-voltage conversion circuit 21 that outputs acceleration signals based on change in the charge output of the detection capacitors 10a, 10b are short-circuited. The standard value of the offset output of the acceleration signal generation circuit measured in this state is stored as a standard offset output value. Both the ends of the negative feedback capacitor 21b are short-circuited with predetermined timing when the sensor is in use. In this state, the offset output of the acceleration signal generation circuit is detected as a current offset output value. Based on the comparison of the standard offset output value with the current offset output value, the zero point of acceleration signals is corrected. With this method, the present offset output of the signal processing circuit is measured any time by short-circuiting the negative feedback capacitor 21b with timing with which check is required. This is compared with the standard offset output value, and thus to what extent the offset output has been changed from the acceleration signal measured in standard state can be grasped with ease and reliability. As a result, zero point drifts caused by various factors including the aging and temperature characteristics of the acceleration sensor can be corrected with any timing regardless of whether the vehicle is in a horizontal position or not. When only the present offset output, that is, the current offset output value and the standard offset output value previously measured and stored are present, processing itself can be basically completed solely by the sensor. Thus, during correction, dependence on vehicle signals can be minimized. With the negative feedback capacitor 21b short-circuited, the capacitances of the detection capacitors 10a, 10b do not have influence on the output of the acceleration signal generation circuit. Thus, even when gravitational acceleration is exerted in the background on a sloping ground, that does not have influence on offset output at all. Therefore, such horizontality detection as disclosed in the prior art is unnecessary.

For the standard offset output value, an offset output value measured with reference timing antecedent to check timing in chronological order. (The reference timing is preferably the time when the sensor system is new or nearly new, for example, when the sensor system is shipped, mentioned above.) The zero point correcting means is so constructed as to correct secular drifts in offset output value during the period from the time according to the reference timing to the time according to the check timing. A drift can occur in the zero point of the charge-voltage conversion circuit (or the acceleration signal generation circuit including it). The drift can be caused by some factor with time from the time according to the reference timing at which the standard offset output value is measured. Even when such a drift occurs, it can be corrected with reliability by the above-mentioned constitution of the zero point correcting means.

There are various simple methods for switching the state of both the ends of the negative feedback capacitor 21b of the charge-voltage conversion circuit 21 between short circuit and non-short circuit for zero point correction. An example of such methods is a constitution that a switch portion for short-circuiting the negative feedback capacitor 21b is provided in a short-circuiting path for short-circuiting both the ends of the negative feedback capacitor 21b of the charge-voltage conversion circuit 21. In this case, the zero point correcting means can be so constructed that it is provided with a switch controlling means. The switch controlling means keeps open the switch portion for short-circuiting the negative feedback capacitor 21b in normal operation in which acceleration detection is carried out. The switch controlling means closes the switch portion for short-circuiting the negative feedback capacitor 21b with the check timing.

The offset output of the acceleration sensor is greatly influenced by the temperature of an environment in which the sensor is used, as mentioned above. Therefore, the zero point correcting means can be effectively so constructed as to have a means for correcting the sensor output for temperature. In this case, for the standard offset output value, a value measured at reference temperature (certain room temperature, for example, 20° C.) can be used. The means for correction for temperature can be so constructed that it comprises: the temperature sensor 55; the EEPROM 54 as the correction information storage unit that stores the information of details of correction carried out on the sensor output at various temperatures; the microcomputer 53 as a correction computing means that refers to the correction information stored in the correction information storage unit and computes an offset for sensor output based on the detected temperature value detected by the temperature sensor 55 with the check timing. Thus, in addition to drift components due to aging, gravitational acceleration on a sloping ground, or the like, drift components due to temperature can be simultaneously corrected. As a result, the accuracy of acceleration measurement can be further enhanced.

Such changes and modifications are to be understood as being within the scope of the present invention as defined by the appended claims.

What is claimed is:

1. An acceleration sensor system comprising:
a first fixed electrode and a second fixed electrode;
a movable electrode disposed between the first and the second fixed electrodes for providing a first capacitor between the first fixed electrode and the movable electrode and a second capacitor between the second fixed electrode and the movable electrode;
a detection capacitor for detecting a capacitance difference between the first capacitor and the second capacitor;
a charge voltage conversion circuit for outputting and converting a capacitance change of the detection capacitor to an output voltage, the capacitance change being derived from a displacement of the movable electrode caused by an acceleration applied to the sensor;

a detection bias voltage applying means for applying a detection bias voltage between the first fixed electrode and the second fixed electrode;

a vibrating means for vibrating the movable electrode in an acceleration detection direction in such a manner that the movable electrode is displaced in a first period in which the vibrating means applies a displacement bias voltage to the movable electrode, the movable electrode is returned in a second period in which no displacement bias voltage is applied to the movable electrode, and the first and the second periods are repeated alternately;

a sampling means for sampling the output voltage of the charge voltage conversion circuit to detect the acceleration in such a manner that the sampling means selectively samples the output voltage during the second period in a case where the movable electrode is steadily vibrated; and an acceleration signal generating and outputting means for generating and outputting an acceleration signal on the basis of a sampling result of the output voltage of the charge voltage conversion circuit.

2. The system according to claim 1, wherein the first capacitor and the second capacitor are connected in series, the displacement bias voltage is repeatedly applied to the movable electrode for vibrating the movable electrode in a state where the detection bias voltage is applied to the detection capacitor, and the movable electrode is disposed in a neutral position between the first and the second fixed electrodes, the neutral position corresponding to a state where no acceleration is applied to the sensor and no displacement bias voltage is applied to the movable electrode.

3. The system according to claim 1, wherein the second period has a length, which is determined to stabilize the output voltage of the charge voltage conversion circuit to a predetermined constant value after the output voltage of the charge voltage conversion circuit in the second period just before the first period is gradually increased in accordance with repetitive vibration of the movable electrode when no acceleration is applied to the sensor.

4. The system according to claim 3, wherein the acceleration signal generating and outputting means generates and outputs the acceleration signal on the basis of a difference between the first and the second data.

5. The system according to claim 3, wherein the detection bias voltage applying means sets a primary term and a secondary term, the detection bias voltage has a first polarity in the primary term, and the detection bias voltage has a second polarity in the secondary term, the first polarity is opposite to the second polarity, the vibrating means performs the first period of the displacement bias voltage during the primary term of the detection bias voltage applying means, and switches the first period to the second period before the detection bias voltage applying means is changed from the primary term to the secondary term, the sampling means samples a first data of the output voltage of the charge voltage conversion circuit in the primary term after the vibrating means switches from the first period to the second period, and samples a second data of the output voltage of the charge voltage conversion circuit in the secondary term, and the detection bias voltage applying means sets a primary term and a secondary term in the second period, the detection bias voltage has a first polarity in the primary term of the second period, and the detection bias voltage has a second polarity in the secondary term of the second period, the first polarity is opposite to the second polarity, the sampling means samples a first data of the output voltage of the charge voltage conversion circuit in the primary term, and samples a second data of the output voltage of the charge voltage conversion circuit in the secondary term, and the acceleration signal generating and outputting means generates and outputs the acceleration signal on the basis of a difference between the first and the second data.

6. The system according to claim 5, wherein the primary term is longer than the secondary term.

7. The system according to claim 5, wherein the sampling means samples the first data of the output voltage in the primary term after a predetermined time passes from a time when the vibrating means switches from the first period to the second period.

8. The system according to claim 5, wherein the secondary term is disposed in the second period, and
the vibrating means switches from the second period to the first period just after the secondary term.

* * * * *